United States Patent
Pelonis

(10) Patent No.: US 6,664,750 B2
(45) Date of Patent: Dec. 16, 2003

(54) D.C. MOTOR BRIDGE COIL DRIVER

(75) Inventor: Kosta L. Pelonis, Taipei (TW)

(73) Assignee: Pelko Electric (HK) Ltd. (CN)

( * ) Notice: Subject to any disclaimer, the term of this patent is extended or adjusted under 35 U.S.C. 154(b) by 56 days.

(21) Appl. No.: 10/097,998

(22) Filed: Mar. 13, 2002

(65) Prior Publication Data

US 2003/0173922 A1 Sep. 18, 2003

(51) Int. Cl.[7] .................... H01R 39/46; H02K 13/00; H02P 7/50
(52) U.S. Cl. .................. 318/439; 318/254; 318/138; 318/244; 318/246; 388/907.2; 361/99; 361/91.5; 363/56.02; 363/58; 363/132; 363/136
(58) Field of Search ................... 318/439, 254, 318/138, 244, 245, 43, 135, 726, 737, 738, 246, 251, 252; 388/907.2, 917–919; 363/170, 174, 175, 176, 56.01–56.12, 58, 132, 136; 361/33, 88, 91.1–91.8, 86; 310/173, 128, 135

(56) References Cited

U.S. PATENT DOCUMENTS

| | | | | |
|---|---|---|---|---|
| 4,545,004 A | * | 10/1985 | Kade et al. | 363/63 |
| 5,376,866 A | * | 12/1994 | Erdman | 318/254 |
| 5,459,654 A | * | 10/1995 | Williams et al. | 363/98 |
| 5,541,487 A | * | 7/1996 | Yorozu | 318/685 |
| 5,631,527 A | * | 5/1997 | Canclini | 318/254 |
| 5,760,555 A | * | 6/1998 | Yamano et al. | 318/293 |
| 5,903,121 A | * | 5/1999 | Heine et al. | 318/434 |
| 6,049,184 A | * | 4/2000 | Uggla et al. | 318/434 |
| 6,239,565 B1 | * | 5/2001 | Alvaro et al. | 318/254 |
| 6,307,337 B1 | * | 10/2001 | Nelson | 318/254 |
| 6,456,024 B1 | * | 9/2002 | Schmider et al. | 318/254 |
| 2001/0000293 A1 | * | 4/2001 | Makaran | 318/254 |

FOREIGN PATENT DOCUMENTS

| | | | | |
|---|---|---|---|---|
| EP | 538618 A2 | * | 4/1993 | H03K/17/08 |
| JP | 05244796 A | * | 9/1993 | H02P/7/29 |

* cited by examiner

Primary Examiner—Robert E. Nappi
Assistant Examiner—Edgardo San Martin
(74) Attorney, Agent, or Firm—Paul & Paul

(57) ABSTRACT

An H-type motor bridge coil driver circuit is implemented with an electronic switch in each leg segment of an H-shaped circuit, this bridge circuit having its side legs each connected between a power supply and ground, with the inductive load of a motor coil being connectable as the cross leg of the H-shaped circuit. An alternate current path, voltage level stabilizing element may be connected across each leg segment electronic switch. A coil excess energy storage element may be connected to the coil nodes of the circuit, through alternate current path elements and utilized to temporarily store the discharging of the excess coil energy normally available because of the lagging nature of the motor coil current. This temporary storage element then may discharge this energy back to the power supply through a passive circuit element, and reverse polarity protection is included for the power supply.

25 Claims, 5 Drawing Sheets

D.C. MOTOR BRIDGE COIL DRIVER

RELATED APPLICATIONS

Not applicable.

FEDERALLY SPONSORED RESEARCH

Not applicable.

MICROFICHE APPENDIX

Not applicable.

BACKGROUND OF THE INVENTION

The present invention relates to a coil driver, bridge circuit for a direct current motor. Specifically, it relates to bridge circuits for providing the excitation current to the field coils in an electronically commutated D.C. motor.

An electronically commutated, brushless, D.C. motor can have a rotatable permanent magnet rotor, a stator that carries field coils, coil driver circuits, and coil drive control timing circuitry for controlling the operating state of each coil driver circuit for thereby implementing the sequential excitation of the motor field coils. A brushless D.C. motor eliminates or reduces the disadvantages inherent in the mechanical structure of a mechanically commutated motor, i.e., a motor with a commutator and brushes. Specifically, RFI (radio frequency interference) losses and EMI (electromagnetic induction) losses are reduced or eliminated. Also, the brush maintenance factors and the armature maintenance factors are eliminated. Moreover, the power consumption, attributed to armature-brush arcing, is also eliminated.

Typically, a motor electronic timing circuit, which incorporates active electronic components, has been used to provide and/or control the excitation of each motor coil, by controlling the operating state of each, respective, coil driver circuit. In the motor, each coil driver circuit is connected directly between a power supply and each motor coil. The operating state of the coil driver circuit is controlled by control pulses generated by the electronic timing circuit. The electronic timing of the generation of control pulses to each coil driver circuit can be synchronized with rotor position, wherein monitoring and/or feedback circuitry is incorporated, including the use of optical position sensors or magnet position sensors. The power supply and the control pulse generating, electronic timing circuit are sensitive to reverse voltage and voltage spike conditions which can be generated in a coil portion of the circuit network, under electrical fault conditions, rotor stall conditions, and other effects. Each coil driver circuit is a bridge circuit connecting the control portion of the network to the load (coil) portion of the network. It is desirable for bridge coil driver circuits to incorporate reverse voltage and voltage spike protection, thereby isolating the sensitive power supply circuitry and sensitive electronic control circuitry.

Pulse width modulation (PWM) is used in the electronic timing circuit to control each bridge coil driver circuit. The width of these pulses affects the instantaneous torque developed by the coil excitation in the motor, and the pulse rate affects the motor speed. The duty cycle of the generated drive pulses (pulse width) is controlled electronically.

The sensitive circuitry used to generate the PMW control pulses cannot be subjected to over voltage and over current spikes caused by motor faults and stalls, nor can it be subjected to spikes often generated when the excitation drive current to a field coil is stopped. Such circuit conditions can burnout this delicate pulse drive circuitry. Moreover, such sensitive circuitry cannot normally carry (pass through) the power needed to excite of the motor field coils, without again burning out. Bridge circuits, whose operation is controlled by the PWM output from the electronic timing circuit, can be used to power the motor field coils directly.

The use of turn off, turn on, "snubber circuits" as a part of a coil bridge circuit, to protect power electronics from overvoltage or overcurrent conditions, is not new. These snubber circuits bridge the connection between the electronic timing circuit and the motor (phase) field coils that are excited. Snubber circuits are devices that limit such over voltage and over current transients that can occur during or immediately after the deactivation of a field coil. These snubber circuits have taken one of two forms, dissipative snubbers and regenerative snubbers.

Dissipative snubbers are circuits which shunt such overvoltage and overcurrent transients to ground. The most common configuration for a dissipative snubber is a Resistor-Capacitor-Diode circuit (RCD) connected between one end of a field coil and ground, with the field coil excitation "switch" connected in parallel with the RCD snubber. This device has proven to be somewhat unsatisfactory in unipolar brushless D.C. motors where low voltage, high current is used. In a unipolar brushless D.C. motor, the current in the coil windings flows in one direction through the coils from a D.C. source to ground.

RCD snubbers have been used in low side drive or boost converter type motor drives. With high side drive configurations, these elements are replaced by diodes connected to the positive voltage. A high side drive is where the excitation switch is connected between the voltage supply (power supply) and the load (field coil) being excited. Some high power, low voltage type switching devices have been used in such snubber. Examples are MOSFETs (metal oxide semiconductor field effect transistors). Reverse protection diodes are used to protect motor (phase) field coils from shorting out. Other diodes provide reverse protection to MOSFET containing circuitry because of the MOSFET circuit source to drain diodes that become forward biased during a reverse polarity condition.

Regenerative snubbers return the energy stored in snubber circuit elements back to the positive voltage supply. Many of these have used transformers, or active elements such as D.C. power supplies (batteries). These prior regenerative snubbers have been used to maintain a constant voltage across the switches in order to prevent a braking of the motor through back electromotive force (EMF); and have also been used to return excess energy stored in the motor field coils back to the positive voltage supply. The elimination of the motor braking action reduces the previously induced voltage spikes due to braking EMF.

Markaran (U.S. patent application Ser. No. 2001/0000293 A1) shows and actively controlled regenerative snubber (power output circuit) for a unipolar brushless D.C. motor. Markaran's circuitry has an output bridge snubber circuit connected to each motor phase (field) coil. The Markaran bridge circuit includes the series connection of a coil and a capacitor in parallel with a motor field coil, and a cross-connected diode, from the grounded side of the coil to the intermediate point of this series LC circuit. The Markaran bridge circuit maintains a constant voltage across its switches (which are each implemented by transistor devices) to prevent avalanching (i.e., breaking down of the transistor switch) which would result in the braking of the motor through conduction of motor back EMF. Markaran's concern is minimizing switching losses. Markaran operates his bridge switches at a constant frequency "$f_c$".

Upon opening the Markaran field coil excitation switch S1, the residual energy in the Markaran field coil L begins to discharge through the snubber diode D1 and into the capacitor C connected to ground. This limits the voltage drop across the coil activation switch S1 once it is opened. Once the voltage on the Markaran capacitor C reaches a pre-selected threshold voltage, his second switch S2 is closed and the capacitor C begins to discharge through the inductor L2. Markaran's stated purpose for the inductor L2 is to slow the discharge of the capacitor C and to ensure that the capacitor is discharged in a sinusoidal fashion for harmonic minimization of the discharge current. The value of the snubber diode generally locks in the effective voltage range of the circuit, which is then limited to that value.

Alvaro, et al. (U.S. Pat. No. 6,239,565 B1) show an output bridge circuit for exciting two phase (field) coils W under the control of signals from a driver circuit DC. Alvaro activates a coil excitation switch SW to excite a desired field coil W. The coil excitation current is to flow from a supply to ground. Alvaro inserts a MOSFET in his ground leg leading from each switch W and controls the conducting state of this MOSFET with signals from the driver circuit DC. A diode bridge RB is used on the power supply to protect from reverse spikes. Alvaro includes an RC (resistor-capacitor) voltage protection circuit PC on the control line to the MOSFET. This RC circuit is used to turn on a transistor T, to shunt to ground the activation voltage from the driver circuit to the MOSFET, when the signal from the driver circuit remains high for a period longer than the time constant of the RC circuit.

The Alvaro capacitor in the RC circuit PC will also charge when the rotor is suddenly stopped due to a fault condition. The same time constant will shut off the MOSFET and therefore the excitation current to the field coils. This protects the motor from over heating burnout.

While prior art bridge circuits may provide over voltage and/or over current protection, they generally do not consider dissipating the energy present in a field coil back to the power supply, or if they do, they do not take into consideration noise reduction, i.e., the reduction of electromagnetic interference, nor cross-conduction and other types of energy losses present with plural inductor circuits.

An object of the present invention is to provide a bridge circuit for driving D.C. motor coils that provides transistor over voltage protection.

Another object is that such bridge circuit operates so that excess coil energy, i.e., the residual coil energy at de-energizing time, is captured (stored) and re-used (returned to the supply).

A further object for such bridge circuit is that it minimizes electromagnetic interference.

An additional object for such bridge circuit is that it avoids or significantly reduces cross-conduction and other similar circuit losses.

An additional further object for such bridge circuit is that it minimizes biasing currents and reduces power supply output transistor overheating.

SUMMARY OF THE INVENTION

The objects of the present invention are realized in a D.C. motor, H-type bridge, coil driver circuit connected to a power supply, and which bridge coil driver circuit operates to excite a phase (a field coil) in a brushless, electronically commutated D.C. motor. An individual bridge coil driver circuit is connected to power a respective one of each of the motor field coils. The bridge circuit is structured to cause the lagging, residual, excess current in a field coil to be routed back to the power supply. Current flow through a coil is bi-lateral and is caused to flow, according to the instantaneous phase relation of the coil to the motor rotor polarity, under control of known motor electronic timing pulses, such as pulse width modulated (PWM) pulses. The orientation of the direction of flow of residual coil current remains constant with excitation current.

This H-type bridge, coil driver circuit contains a plurality of transistor switches, one positioned operationally in each leg segment of each side of the circuit's H shape. The leg segment transistor switches are operationally coupled, as cross-diagonal leg segment coordinated switches, with the cross-diagonal pairs being in paired into, i.e., coupled into, exclusive conducting states. The operating states of these transistor switches are manipulated under the control of the PWM input signals. The bi-lateral current flow through the motor coil is thereby achieved for greater power and efficiency.

These transistor switches are connected into series circuit connection, with each series circuit forming a leg segment of the H-shaped circuit. A motor field coil is connectable as the cross leg of the H-shaped circuit, i.e., between the side legs of the H, at the midpoint node between each series connected switch, side leg pair. A respective end of each side leg series-connected switch circuit is connected to the power supply, while the opposite end of each side leg series-connected switch circuit is connected to ground, either directly or through other circuit components.

An alternate circuit path component for each lower leg segment switch is a diode connected in parallel across each lower leg segment transistor switch, which itself has one end connected to the motor coil node and the other end connected to ground. A second alternate circuit path component for each upper leg segment switch is a diode connected from the respective upper leg segment switch's motor coil node, in series with an energy storage device, such as a capacitor, connected to ground. The energy stored in this capacitor can drain to the power supply through a resistor connection there between. Reverse polarity protection may also be included on the power supply feed line.

Electromagnetic interference is reduced, and any cross-conduction created by same leg switches, being on at the same time, is prevented by cross coupling the switches through biasing resistors. Biasing current and power transistor switch heat dissipation are both reduced by incorporating composite transistor switch pairs for the transistor switches.

In operation, a first cross-diagonal coupled switch pair is turned on while the second is off. Then the second cross-diagonal coupled switch pair is on while the first is turned off. With the first switch pair turned on, current flows through the motor coil in a first direction. With the second switch pair turned on, current flows through the motor coil in a second/opposite direction. The exception to this operation is that for a short period after the transition, between conducting states of the switch pairs, there is a voltage increase at the previous coil current flow exit node, due to the lagging nature of the coil current, and until this excess energy is dissipated, current wants to flow through the coil in the previously flowing direction. This current is allowed to flow in that direction through the alternate circuit path to charge the capacitor. During this short transition period no current is drawn from the power supply. After this period the capacitor drains towards the power supply and thereafter, normal current flow occurs from the power supply, in the now established second/opposite direction.

BRIEF DESCRIPTION OF THE DRAWINGS

The features, advantage and operation of the present invention will become readily apparent and further understood from a reading of the following detailed description with the accompanying drawings, in which like numerals refer to like elements, and in which.

DETAILED DESCRIPTION OF THE INVENTION

The present invention is an improved H-type electronic bridge coil driver circuit connectable into a motor field coil, for exciting that coil with current from a power supply, under the control of pulse width modulated (PWM) signals from a known motor electronic driver circuit. This coil driver, bridge circuit is used in an electronically commutated brushless D.C. motor. It implements a bi-lateral current flow in a motor coil for enhanced control and efficiency. The residual energy and current flow, normally contributed to the inductive nature of a coil at each transition time, is allowed to continue to flow, to be stored, and then to used to supplement the power from the power supply. Electromagnetic interference noise is minimized, and cross-conduction losses normally present in an H-type bridge are avoided. Circuit biasing current is minimized and overheating of power transistors is reduced.

D.C. brushless motors have many applications, including being used to cool computer power supplies and computer cases. It is important that they are efficient and create little heat and noise. Bridge circuits are used to transition from the electronic control of these motors to the power drive of the motor coils. H-type bridge circuits have been used where coil current is to be bi-directional (bi-lateral current flow).

Figure 1A:
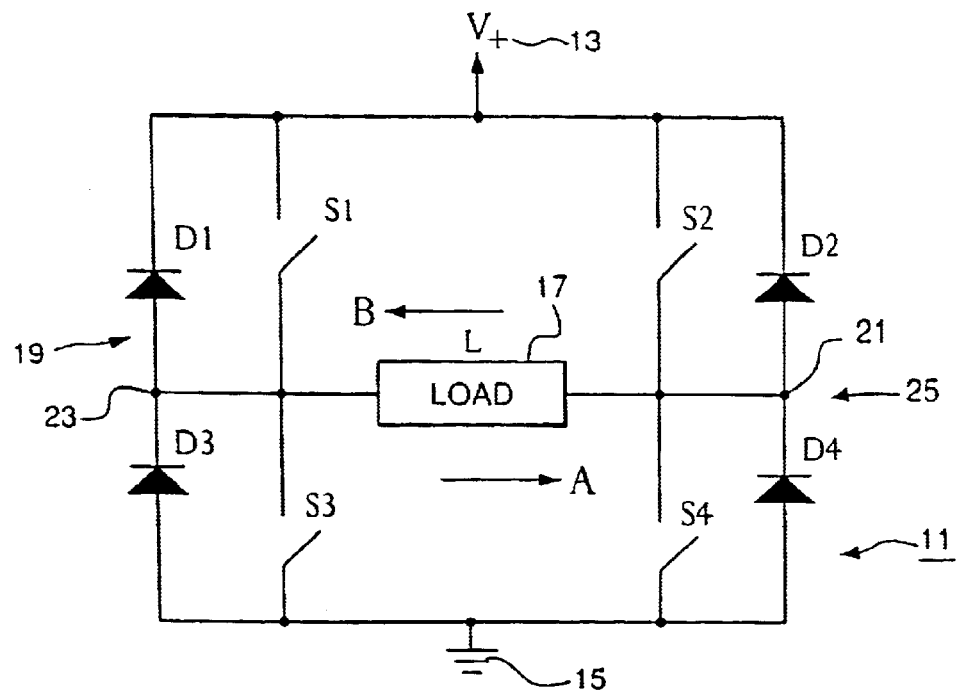
FIG. 1a is a functional circuit diagram for a prior art, H-type, motor coil, bridge circuit.

FIG. 1a shows a standard, prior art, H-type bridge, motor coil driver circuit 11, with two pairs of cross-diagonal leg segment operated switches (S1, S4 and S3, S2). This H-shaped bridge circuit 11 is connected between a power supply 13 and ground 15 with the load 17 being connected as the cross leg of the H shape. The switches S1, S3 are connected in series to form the left leg 19 of the circuit 11, while the switches S2, S4 are connected in series to from the right leg 21 of the H-shaped circuit 11. The motor coil 17 is the load connected as the cross leg, with its two nodes being at the intermediate left and right nodes 23, 25, respectively, of a respective leg 19, 21.

As DC fan motors are essentially inductive loads, and excess coil energy, as much as it is desirable to be saved back into the power supply 13, must be avoided, because it would create conductive interference. This conductive interference could affect the operation of the power supply and the rest of the system powered with the same power supply. For this reason, standard H-type bridge circuits, FIG. 1, provide protective diodes D1, D2, D3 and D4 connected one each across its switches S1, S2, S3, S4, respectively. Each diode D1–D4, is connected in forward polarity with respect to ground 15, i.e., in reverse polarity with respect to the power supply 13.

It is understood that the switches S1–S4 are each normally implemented with power switching transistors, whose gating (conductive state) is each controlled by the PWM control signals on its base junction. The collector-emitter saturation voltage of a bipolar transistor switch typically ranges from 0.3 V to 1.2 V, depending on the current passing through the switch.

When switching occurs from the S1, S4 pair to the S2, S3 pair, the current direction is to be reversed through the load 17. However, before that can occur, the inductive effect of the load 17, i.e., motor coil 17 residual energy must dissipate. As the transition excess coil 17 energy dissipates, the voltage on the down current node of the coil 17 appears temporarily greater than the voltage from the power supply 13. First at node 21, when the current flows in direction "A", with the S1, S4 pair conducting, and then at node 23, when the current flows in direction "B", with the S2, S3 pair conducting. This would cause conductive interference and create voltage spikes. This conductive interference would affect the power supply and other circuitry powered by that power supply. The respective diodes D1, D4, provide an alternate path to the respective open switches S1, S4, which allows the excess coil energy to shunt around the respective open switch S1–S4, to ground 15.

Figure 1B:
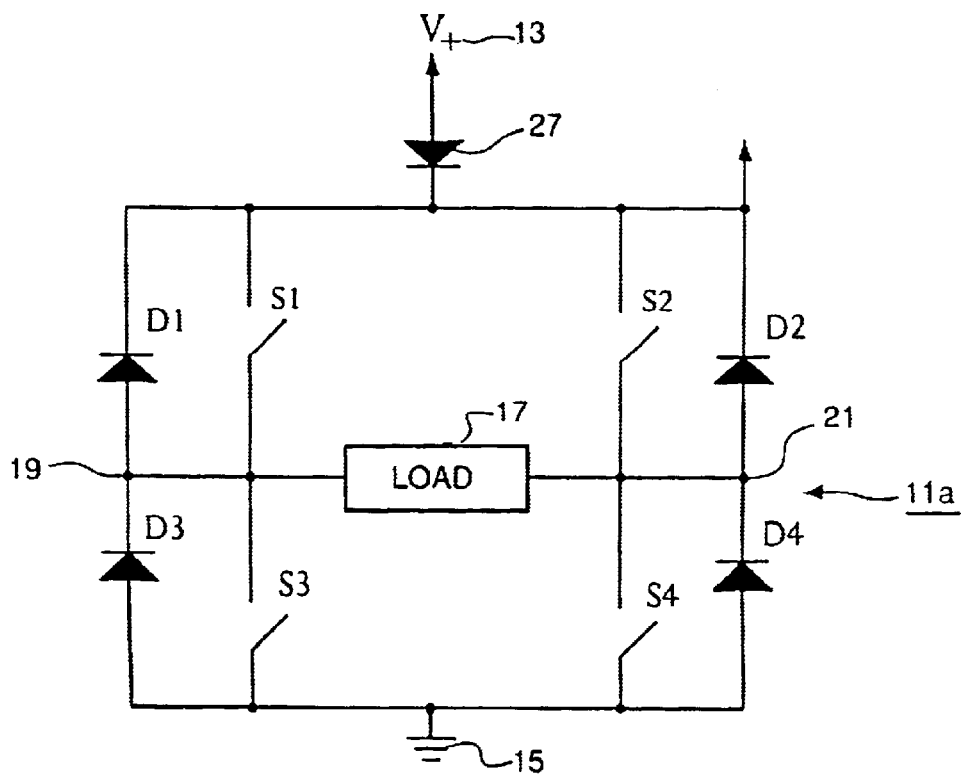
FIG. 1b shows the prior art H-type, motor coil, bridge circuit, of FIG. 1a, with power supply reverse polarity protection.

FIG. 1b, shows a circuit modification 11a, to the standard H-type electronic bridge circuit of FIG. 1. In this circuit 11a, a reverse polarity diode 27 is connected in series with the power supply 13, to assure that no burn out occurs by user error. In circuit 11, FIG. 1, the power supply 13 is vulnerable to user errors and improper connections. However, with this reverse polarity diode 27, FIG. 2, inserted to protect the power supply, the modification renders the transistor switches S1, S4 protected only against negative voltage spikes and not protected against positive spikes.

Figure 2:
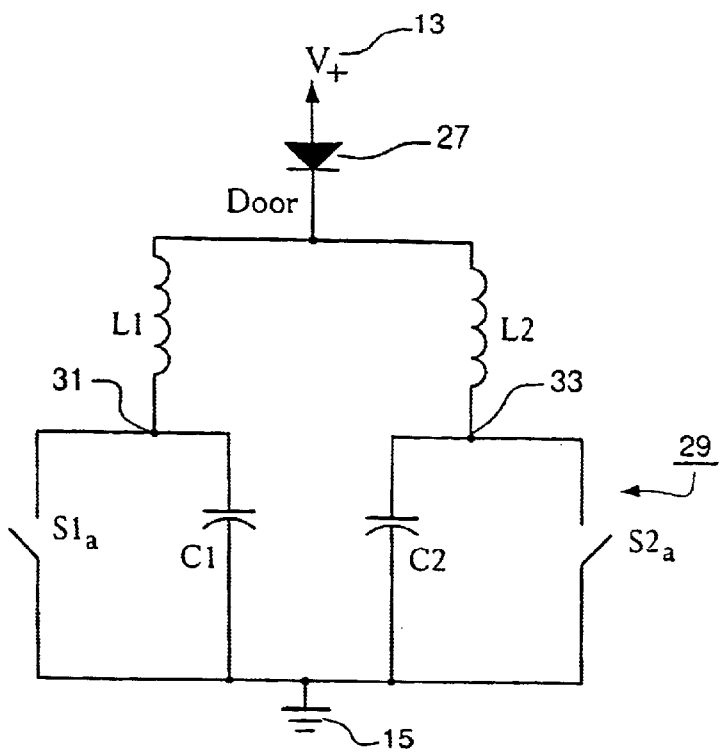
FIG. 2 is a prior art, dual coil, bridge circuit with switch protection and electromagnetic interference reduction.

FIG. 2 shows a widely used bridge circuit, which deviates from an H-type configuration. This circuit 29 is used for transistor protection and has some electromagnetic interference reduction. Each coil L1, L2 is connected to the power supply 13 on one end, and through a parallel circuit of a switch and capacitor to ground 15 on the other end. The switch S1a is connected across the capacitor C1, while the switch S2a is connected across the capacitor C2.

In this circuit 29, the coils L1 and L2 can represent motor load (motor coils). When switch S1a is switched on and switch S2a is switched off, node 31, at the switch connection of coil L1, goes to ground and node 33, at the switch connection of coil L2, tends to go higher than the voltage of the power supply 13 (assuming that L2 had previously been conducting). Capacitor C2 reduces the voltage spike at node 33 and allows the lagging current of coil L2 to flow through it. The voltage at node 33 then reaches the power supply 13 voltage and at the next switching time, when S2a is turned on, the capacitor C2 discharges through switch S2a causing additional heat and waste of energy. This circuit operation is repeated for the other side of the circuit 29, for the coil L1, node 31, switch S1a and capacitor C1.

Figure 3:
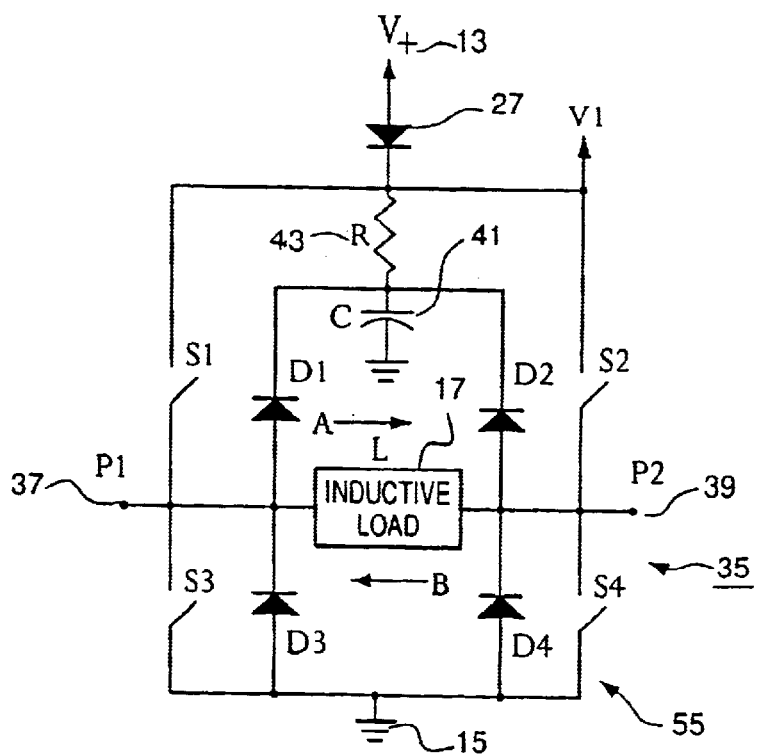
FIG. 3 is a functional circuit diagram of the present invention, being a H-type, motor coil, drive circuit with switch protection and noise reduction.

The present invention, FIG. 3, is directed to improvements in H-type bridge coil driver circuit design, specifically over the standard circuits of FIGS. 1 and 1a, and also directed to improvements over the switch protection and electromagnetic interference (noise reduction) offered by the previous circuit of FIG. 2 and the other circuits discussed previously above.

The circuit 35, FIG. 3, has first and third switches S1, S3 connected in series between the power supply 13 protection diode 27, and ground 15. The power supply 13 is protected from user errors, with the series connection of the reverse polarity diode 27 to the circuit 35. The switches S1, S3 are leg segments of the left leg of the H-shaped circuit 35. A second series connection of the second and fourth switches S2, S4, from the power supply 13 to ground, forms the right leg of the H-shaped circuit 35, with each switch S2, S4 forming a leg segment thereof.

A motor coil 17 is connectable as the cross leg of the H-shaped circuit from the mid-point of the left leg, being the intermediate point of the series connection of the first and third switches S1, S3, at node 37, to the mid-point of the right leg, being the intermediate point of the series connection of the second and fourth switches S2, S4, at node 39. The third diode D3 is connected across (in parallel to) its respective third switch S3, while the fourth diode D4 is connected across (in parallel to) its respective fourth switch S4. The first diode D1 is connected with forward polarity with respect to ground from the node 37, and the second diode D2 is connected with forward polarity with respect to ground from the node 39. The first and second diodes D1, D2 are connected together on their cathodes and then together through a capacitor 41 to ground. The joined cathode connections of these first and second diodes D1, D2 is also connected to the protection diode 27 residing at the output of the power supply 13, and thereby to the power supply 13. This connection is made through the resistor 43. The resistor 43 establishes a discharge path to the power supply node V1.

When the voltage on the capacitor 41 exceeds that of the power supply 13, the capacitor 41 will feed back into the power supply node V1.

Figure 4:
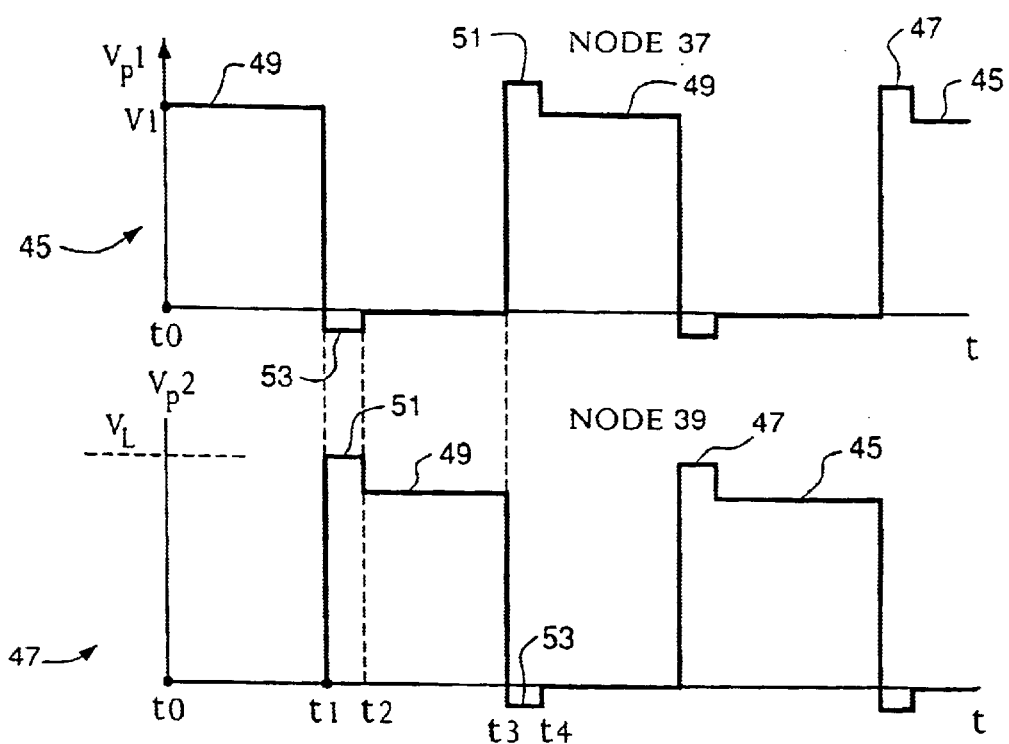
FIG. 4 is timing diagram for the voltage, which appears at each side of the connectable motor coil of FIG. 3, as the switches are operated under control signals.

Referring to FIG. 4, plot 45 shows the voltage at node 37, and plot 47 shows the voltage at node 39, for cycle times t0, t1, t2, t3 and t4.

At time t0, first and fourth transistor switches S1 and S4 are turned on and current will start to flow in direction A, from node 37 to node 39. Specifically, from the power supply 13, through switch S1, through the coil 17, through switch S4 to ground. Node 37 is at the potential of the power supply 13 output voltage and will remain at that voltage for as long as the first and fourth switches S1, S4 are in the "on" state (conducting) and the second and third switches S2, S3 are in the "off" state (non-conducting).

At time t1, first and fourth switches S1, S4 are switched off (non-conducting) and the opposite pair, second and third switches S2, S3 are switched on (conducting). Node 39 should then rise to the voltage of the power supply 13. However, because of the inductive nature of the coil 17, the residual energy then in the coil will, for a short time, continue to flow in the same direction, such that the potential (voltage level) at node 39 will for that short time have a tendency to be higher than the supply voltage. A resultant current path for that short period of continued flow in the first direction (direction A) will be from ground 15, through the third diode D3, the coil 17, the second diode D2 and the capacitor 41. This continues until time t2, and as seen from the plots 45, 47. During this period t1–t2, the voltage at node 37 is relatively negative and that at node 39 is positive above the power supply voltage level 49.

The resultant higher voltage level 51, at node 39 during the period t1–t2, is approximately a value of two diode drops (diode gate gains, or diode potentials) above the supply voltage 49, due to the effects of the diodes D3 and D2. This approximation assumes that there is negligible coil 17 resistance and the size of the capacitor 41 is large enough to accept the charge. When the capacitor is smaller, some effects of over voltage can be noticed at the power supply node V1. It is therefore, important to size the capacitor 41 as a function of the size of the coil 17, which coil size in turn determines the amount of residual energy (excess coil current) at the switching time. The relative negative voltage 53 at node 37 is about one diode drop below ground, due to the effect of the diode D3.

From time t1 to time t2, there is no current drawn from the power supply 13. At time t2, current starts to flow through the coil in the opposite direction (direction B) and node 39 is at the voltage supply 13 potential 49. This current flow (direction B) continues for the period t2–t3, and during which time the switches S2, S3 remain closed (conducting) and the switches S1, S4 remain open (off—non-conducting).

At time t3, switches S1, S4 are again turned on (conducting) and switches S2, S3 are again turned off. Node 37 will now reach a voltage potential 51, of two diode drops above the supply 13, voltage level 51. Node 39 will also be at a relative negative potential 53, equal to about one diode drop below previous ground, due to the effect of diode D4. Again, during the transition time period t3–t4 after the switching operation, the excess residual energy continues to flow in the previous direction (direction B), with the current path through ground, diode D4, the coil 17, diode D1 and the capacitor 41. Again, the resistor 43 provides a current path (discharge path) for the charge on the capacitor 41, back to the supply node V1. The discharge starts at time t4.

This circuit operation minimizes electromagnetic interference, provides over voltage protection for the transistor switches, provides reverse polarity protection for the power supply and recovers (re-uses) excess coil energy storage, while operating the motor coil bi-laterally, with two direction (bi-lateral) current flow. An additional important advantage to the circuit is that it can follow (compensate for) voltage variations in that it maintains maximum collector junction voltage for the transistor switches S1–S4 at about two diode drops above the power supply voltage.

Figure 5:
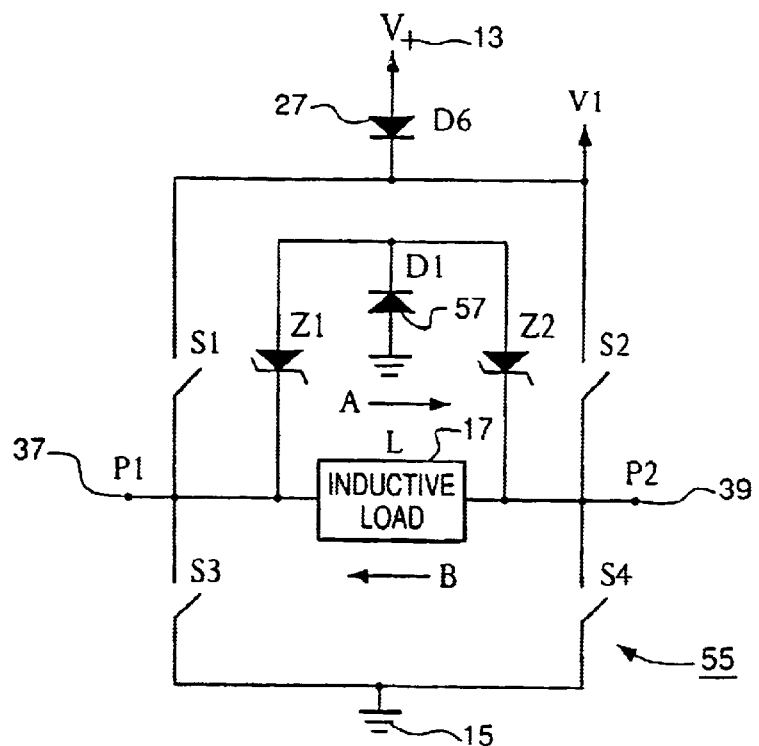
FIG. 5 is functional circuit diagram for an alternate embodiment for the circuit of FIG. 3, wherein the Zener diodes and series diode replace the diode and series capacitor.

FIG. 5 shows an alternative embodiment circuit 55, for the H-shaped circuit 35 of FIG. 3. In this circuit 55, FIG. 5, the transistor switches S1–S4 are connected in series pairs to form the side legs of the H-shape, and these side legs are connected in parallel between the diode 27 carrying output of the power supply 13 and ground 15, as they are in circuit 35 described above. Likewise, the load 17 (motor coil) is connected as the cross leg of the H-shape from the mid-point of each side leg, i.e., between the nodes 37 and 39, respectively, as in circuit 35. The first and fourth switch S1, S4 pair and second and third switch S2, S3 pair are alternately conducting as in circuit 35. Circuit 55 departs from the previous structure by using two Zener diodes Z1 and Z2, connected to a respective node 37, 39, in reverse polarity thereto. The anode side of each Zener diode Z1, Z2 is connected together, and then to ground through a further diode 57. This further diode 57 is connected in forward polarity with respect to ground (anode to ground) which configures this diode 57 in reverse polarity to a current flow to its grounded terminal.

The plots of node voltages at nodes 37, 39, for circuit 55, will be similar to that described in relation to the timing diagrams of FIG. 4, as the switch pairs S1, S4 and S3, S2, for circuit 55, are alternately switched on and off by the PWM control/timing pulses input to this circuit. However, the nodes 37, 39, FIG. 5, will be clamped at maximum positive voltage, which is approximately the sum of the forward voltage drop of one Zener diode plus the reverse voltage drop of the other Zener diode. As this circuit 55 is balanced, the values of both Zener diodes Z1, Z2 is the same, and the voltage drops will likewise be identical regardless of switch pair or direction of flow through the load (motor coil) 17. In operation, the most negative voltage (equivalent to voltage 53 in FIG. 4 for circuit 35) at either node 37, 39 for this circuit 55, will be approximately two diode drops below the previous ground, this being established by the voltage drop across the further diode 57 and a respective Zener diode Z1, Z2, depending upon the side of the H-shaped circuit involved.

Like the previous circuit 35, FIG. 3, this alternate circuit 55, FIG. 5, protects all of the switches S1–S4 and reduces electromagnetic interference. However, the clamping voltage will not permit the nodes 37, 39 to follow the power supply 13 voltage, and there is no storage of excess energy, i.e., no recapture of residual coil energy as in the previous embodiment of circuit 35.

Figure 6:
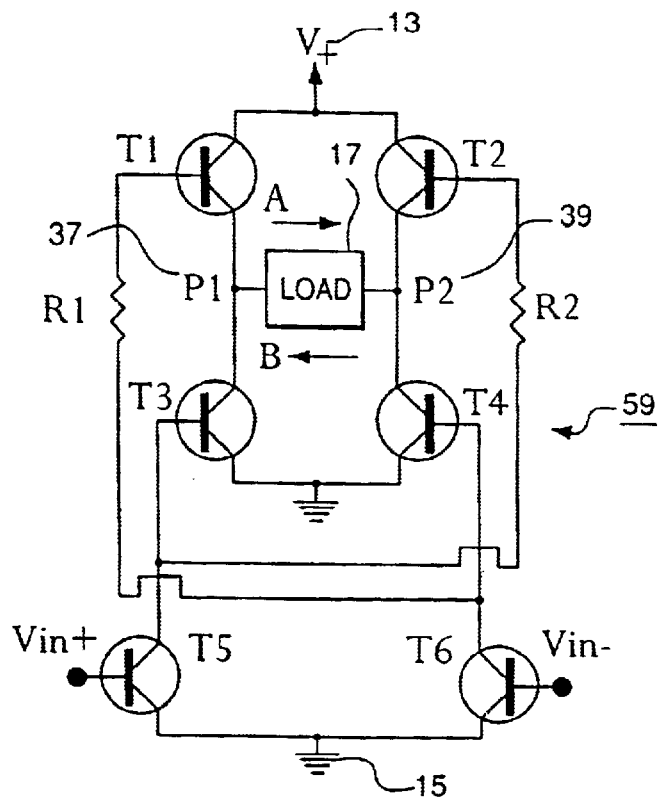
FIG. 6 is circuit diagram for an alternate embodiment for the circuit of FIG. 3, wherein cross conduction is reduced or avoided between leg segment, transistor switches on the same side leg of the H-type circuit.

FIG. 6 shows a further alternate embodiment, circuit 59, in which cross conduction is avoided by a cross coupling connection arrangement between the switches. Cross conduction is when switches in the same side leg may be on (conducting), temporarily, at the same time. Such cross conduction is very detrimental.

In this circuit 59 the H-shaped circuit has the load 17 (motor coil) connected as the cross leg of the H-shape extending between nodes 37 and 39, which are at the mid-point of each side leg. The switches (S1–S4) are respectively shown as PNP transistors T1, T2, T3, T4, respectively. Transistor first and third switches T1, T3 are connected in series, to form the left leg, with their common connection being at node 37. Transistor second and fourth switches T2, T4 are also connected in series, to form the right leg, with their common connection being node 39. The left and right legs are each connected between the power supply 13 and ground 15. No reverse voltage protection diode 27 is shown in this circuit 59, FIG. 6. However, it is understood that this diode 27 may be used.

The base of each transistor T1–T4 is connected to a respective further transistor switch, with the diagonal cross leg first and fourth transistors T1, T4 having their bases (base nodes) cross coupled together to the collector node of a sixth transistor T6, and the base nodes of the other pair, third and second transistors T3, T2, being cross coupled together to the collector node of a fifth transistor T5. The fifth and sixth transistor switches T5, T6 are each NPN transistors with their emitter nodes each connected to ground, and their respective base nodes alternately connected to a positive voltage Vin+ and negative voltage Vin –, on an exclusive basis. These trigger transistors T5, T6, thereby are exclusively in the conducting and non-conducting states. When a trigger transistor T5 or T6 is conducting, it triggers its respectively coupled switch transistor pair T3, T2, or switch transistor pair T1, T4, into the conducting state, respectively. The transistors T5, T6 add an additional stage of security to protect against cross conduction, and can physically be positioned further away from the electromagnetic influences of the H-shaped circuit and the motor coil 17. Biasing resistors R1 and R2 are each connected into the connection from the collector node of triggering transistors T6 and T5, respectively to the base node of switching transistors T1 and T2, respectively. It is understood, as with all of the circuits discussed with regard to the present invention, that the circuit components are matched (balanced—or equal value) between each side of the H-shaped circuit.

In operation, this circuit 59, FIG. 6, has a two-phase control, where the triggering transistors T5, T6 are switching "on" and "off", alternately. When T5 is on, the collector of T5 is low (at ground) and switching transistors T2 and T3 are turned "on". At the same time, T6 is "off", and its collector is approximately one diode drop below the power supply 13. Therefore, the switching transistors T1 and T4 are "off". It is also understood that an identical switching procedure is followed for the other switching transistor pair, T1, T4.

Unless the collector of each respective triggering transistor is sufficiently low, the respectively connected switching transistors cannot conduct. This assures that the voltage levels are at a hard level, i.e., sufficiently different, and eliminates premature triggering at any transition point between "high" and "low", thereby yielding a hard "on" and "off" of the respectively connected diagonal cross leg switches and avoiding cross conduction, i.e., the switching transistors in the same leg accidentally being on concurrently.

Figure 7:
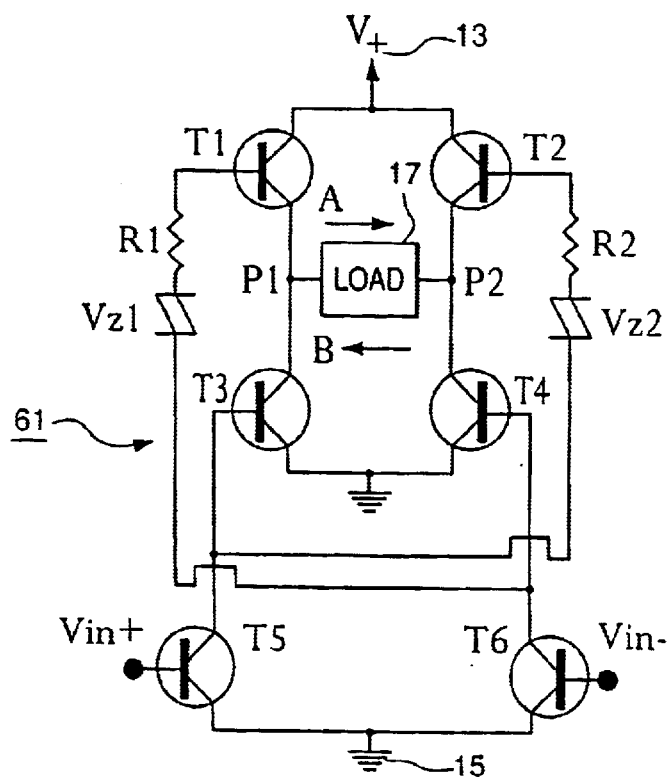
FIG. 7 is a circuit diagram for an alternate embodiment for the circuit of FIG. 6, with further enhanced, cross conduction, reduction.

FIG. 7 shows circuit 61, which is an alternate embodiment of the circuit 59, FIG. 6. This circuit 61 is identical to the previous circuit 59, except that a respective DIAC (trigger switch) Vz1, Vz2 is in series with the biasing resistors R1, R2, respectively. Alternatively, to this DIAC, a Zener diode may be used.

The DIACs Vz1, Vz2 further ensure that no cross conduction occurs. The trigger switch voltage is selected to be about 85% of the power supply 13 voltage. Thus the potential at a respective triggering transistor T5 must be reduced from the supply voltage to as low as 15% of the supply voltage before the respectively connected switching transistors T3, T2 are turned on. It is understood that the switching transistors T1–T4 are the power switches of the circuit.

On the other hand, the collector of triggering transistor T6 must be increased from low (ground or zero) to only 15% of the supply voltage in order to switch off the switching transistors T1, T4. This provides a security that simultaneous conduction of opposite switching transistors is avoided, during the time the triggering transistors T5 and T6 are changing state (between conducting and non-conducting). The circuit operation with respect to the other state (between T6 conducting and T5 non-conduction), of course is understood to be identical. This circuit 61 arrangement permits the use of lower switching speed switch transistors T1, T2, T3, T4. The trigger switches Vz1, Vz2 might not be needed, if the switching transistors T1, T2, T3, T4 are selected with very high switching speeds.

Figure 8:
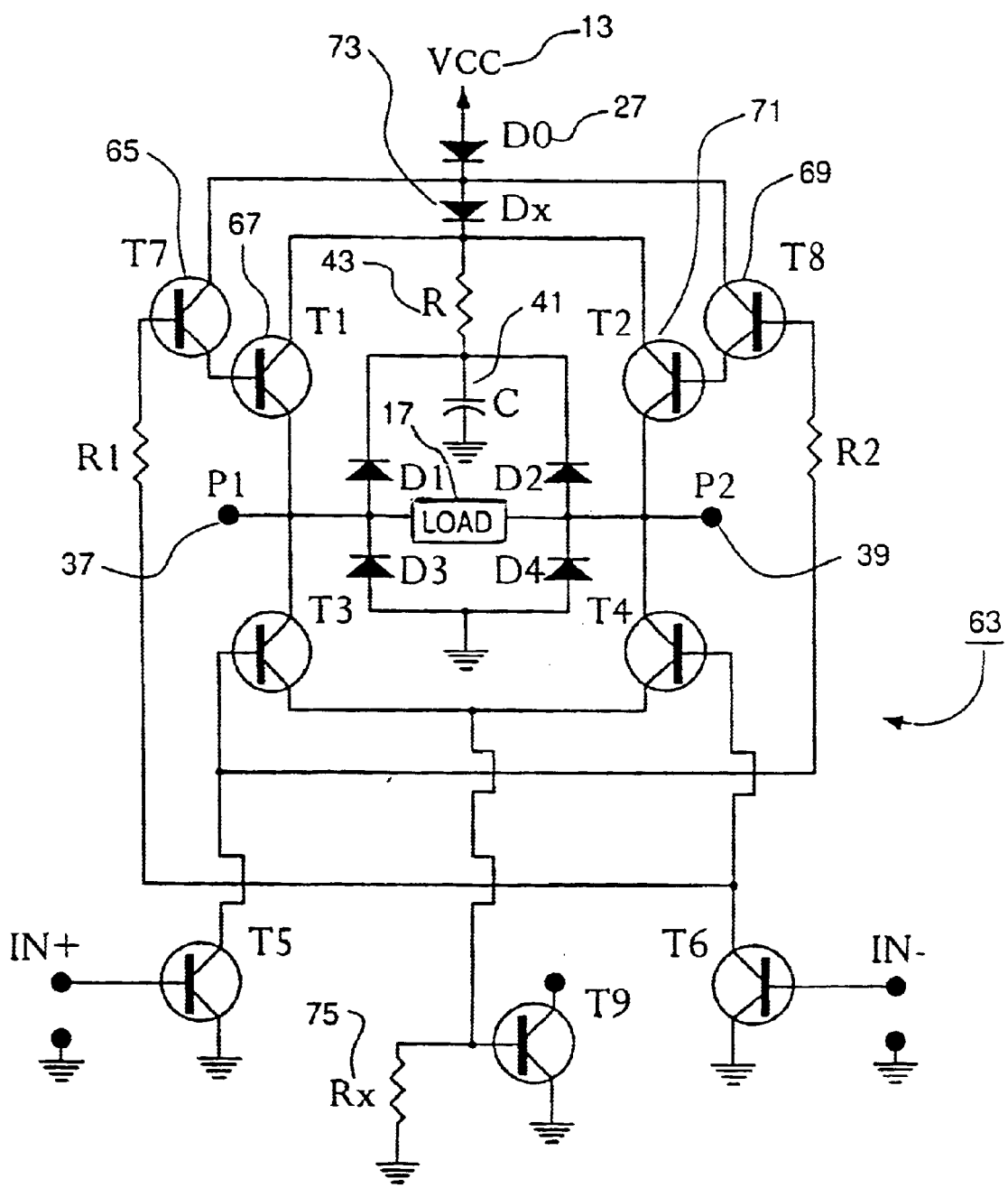
FIG. 8 is a circuit diagram for the circuit of FIG. 3 with the cross conduction protection of FIG. 6 and where the circuit performance is further improved with the substitution of composite PNP transistor circuits for the PNP circuits of FIG. 6.

The circuit 35 configuration, FIG. 3, with the cross conduction configuration considerations of circuit 59, FIG. 6, is shown the composite circuit configuration 63, FIG. 8. Additionally, in this circuit 63, there is a decrease in the bias current flowing through the biasing resistors R1 and R2, and a decrease in power transistor heat dissipation, by changing the PNP transistors T1 and T2 into four composite transistors 65, 67, 69, 71 having a power stage (transistors 67, 71, respectively) and a trigger stage (transistors 65, 69, respectively). In this latter regard, PNP switching transistor T1 has been replaced by the PNP transistor 65 and the NPN transistor 67, and PNP switching transistor T2 has been replaced by the PNP transistor 69 and the NPN transistor 71.

In this circuit 63, FIG. 8, the emitter of transistor 65 is connected to the base of transistor 67, and conversely, the emitter of transistor 69 is connected to the base of transistor 71. The emitter of transistor 67 is connected to the node 37, with the emitter of transistor 71 being connected to the node 39. Further, the emitters of transistors 65 and 69 are each connected together and to the power supply 13, at its reverse voltage protection diode 27. The collectors of the power stage NPN transistors 67, 71 are each tied together at one end of the resistor 43, with the other end of this resistor 43, being connected to ground through the capacitor 41. This collector connection of the power stage transistors 67, 71 is also connected to the power supply 13 at its protection diode 27, through the further coupling diode 73, this diode 73 having the same polarity connection as the protection diode 27.

Biasing resistors R1 and R2 are each connected between the base of their respective triggering stage PNP transistors 65, 69 and the respective trigger switches T6, T5 as described in connection with circuit 59, FIG. 6, above. In this circuit 63, the trigger switches T5, T6, are likewise each connected to the respective switch transistors T3, T4 and the positive voltage IN+ and negative voltage IN− as described above with respect to circuit 59. The switch transistors T3, T4 each have their respective collectors connected to the emitters of the associated power stage transistor 67, 71, respectively.

Unlike the previous circuit 59, in this circuit 63, the collectors of the switch transistors T3, T4 are connected together and then to ground through a series resistor 75. The collectors of the transistors T3, T4 are also connected directly to the base of a signal transistor T9. Transistor T9 has its emitter connected to ground and its collector connected to the controller in the system. The diodes D1, D2, D3, D4 are each connected with respect to the capacitor 41, nodes 37, 39, and ground as described above, in connection with circuit 35, FIG. 3.

In operation, circuit 63 has the advantage in that the base current required to drive (switch) the power stage transistors 67, 71 does pass through the biasing resistors R1, R2. Thus the power level to the load via the nodes 37, 39 is avoided and dissipation losses are reduced. However, for the composite transistor pairs 65, 67 and 69, 71, the saturation voltage will be increased. In order to reduce the saturation voltage, the diode 73 has been added and is now in series with the current sensing resistor 43. This acts to reduce the saturation voltage of the power stage transistors 67, 71 and thereby reducing its heat dissipation and temperature elevation which leads to premature burnout.

In this circuit 63, the signal transistor T9 acts as an over current sensing switch. If the current flowing through the series resistor on its base causes the emitter to base voltage drop to be higher than the turn on transistor voltage, signal transistor T9 will conduct and send a signal to the system controller circuit to shut off trigger switches T5 and T6. The value of this resistor 75 will determine the maximum allowable current level. Any current spikes when trigger switches T5 and T6 change conducting states are sensed. These current spikes can be used as pulses for synchronization at the system controller circuit. It is understood that a shutting off of both of the switches T5 and T6 simultaneously shuts down this circuit 63.

Many changes can be made in the above-described invention without departing from the intent and scope thereof. It is therefore intended that the above description be read in the illustrative sense and not in the limiting sense. Substitutions and changes can be made while still being with the scope of the appended claims.

What is claimed is:

1. A method of operating an H-shaped bridge coil driver circuit, connected to a power supply, for driving a connectable motor coil in an electronically commutated brushless D.C. motor, under the control of signals input to said H-shaped circuit, said H-shaped circuit having a left and right side legs of two serial leg segments, with a switch located each therein, and with said connectable coil forming the cross leg thereof, said H-shaped circuit being connected to said power supply at the top of each side leg and to ground at the bottom of each side leg, said H-shaped circuit also including alternate current path voltage protection elements connected one each in parallel across a respective lower leg segment side switch, comprising the steps of:

connecting said leg segment switches to operate in first and second cross-diagonal pairs and controlling said cross-diagonal switch pairs in alternate conduction states;

closing said first cross-diagonal leg segment switch pair and simultaneously opening said second cross-diagonal leg segment switch pair during a first time period to cause current to flow from said power supply through said connectable coil in a first direction;

closing said second cross-diagonal leg segment switch pair and simultaneously opening said first cross-diagonal leg segment switch pair during a second time period to cause current to flow from said power supply through said connectable coil in a second opposite direction;

repeating the first and second closing and simultaneous opening steps to provide repeatedly successive first and second time period cycles;

permitting the lagging excess energy in said connectable coil to freely discharge therefrom at the beginning of each successive time period by establishing a separate current path to a separate voltage storage element which is charged by the flow of said lagging excess coil energy, whereby during said storage element charging the current in the connectable coil continues in its previously established direction from the previous time period;

establishing a current path from said separate voltage storage element back to said power supply to discharge said storage element back into said power supply; and permitting the discharge from said separate voltage storage element to provide the current to said coil thereby relieving the power supply until said voltage storage element voltage falls below that of the power supply.

2. The method of claim 1, also including after the step of closing said first cross-diagonal leg segment switch pair, the step of establishing over voltage protection for each switch of said second cross-diagonal leg segment switch pair.

3. The method of claim 2, also including after the step of closing said second cross-diagonal leg segment switch pair, the step of establishing over voltage protection for each switch of said first cross-diagonal leg segment switch pair.

4. The method of claim 3 also including during the step of closing said first cross-diagonal leg segment switch pair and during the step of closing said second cross-diagonal leg segment switch pair, the step of sensing for current spikes at switch change over times and signaling the presence of these spikes for timing purposes.

5. A method of operating an H-shaped bridge coil driver for a motor coil, for switched bi-lateral coil current flow, and for capturing and reusing switch over lagging coil energy, comprising the steps of:

establishing a potential equal to the power supply voltage level at a first node of said coil and ground potential at a second other node of said coil during a first time period;

switching current flow states and establishing a negative potential relative to ground at the first node of said coil, and a positive potential relative to the power supply at the second node of said coil, during a short second time period occurring after said switching;

establishing a ground potential at the first node of said coil and the power supply potential at the second node of said coil in a third time period occurring after said second short time period;

further switching current flow states and establishing a positive potential relative to the power supply at the first node of said coil, and a negative potential relative to ground at the second node of said coil, during a short fourth time period occurring after said further switching; and re-establishing power supply potential at the first node of said coil and ground potential at the second node at the second node of said coil during a fifth time period occurring after said fourth short time period.

6. The method of claim 5 wherein the fifth time period step is repetitive of the first time period step, and wherein the other steps repetitively occur in cycles.

7. The method of claim 6 wherein the relative positive potential increment is twice the size of the relative negative potential increment.

8. The method of claim 7 wherein the short second time period and short fourth time periods are of equal length and equal to the time to discharge lagging energy in the coil at switching.

9. An H-shaped bridge circuit for bi-laterally driving a field coil in an electronically commutated brushless D.C. motor, under the control of signals from the motor controller, said H-shaped coil driver bridge circuit being connectable to a power supply, to ground, and to a first and a second coil nodes, and having side legs with series leg segments each containing a switch, the coil being connectable as the cross leg of the H shape between the side leg mid-points, comprising:

a first diagonal cross coordinated operation switch pair formed from the leg segment switches and thereby being connectable to both said coil node connections, to said power supply connection, and to said ground connection, for providing a first current flow path from said power supply connection through said coil nodes connection to said ground connection in a first direction;

a second diagonal cross coordinated operation switch pair formed from other of the leg segment switches and thereby being connectable to both said coil node connections, to said power supply connection, and to said ground connection, for providing a second current flow path from said power supply connection through said coil nodes connection to said ground connection in a second direction;

wherein said first switch pair and second switch pair are each connectable to said control signals thereby being controlled to have said switch pairs conducting alternately, wherein said first direction current flow causes current to flow through said connectable coil in a first direction and said second direction current flow causes current to flow through said connectable coil in a second opposite direction, thereby providing bilaterally changing coil current states;

alternate circuit means for permitting lagging excess energy in said connectable coil to flow after a change of coil current state thereby providing a transition current flow through said coil continuing in the previous direction, said alternate circuit means including a voltage storage element which charges as said transition current flows to a voltage level in excess of the power supply; and current flow path means for discharging the excess voltage stored in said storage means back to the power supply; and wherein power is not drawn from said power supply while said storage means is discharging back into the power supply.

10. The bridge circuit of claim 9 wherein said alternate circuit means includes:

a first diode connected from said ground connection to said first coil node;

a second diode connected from ground to said second coil node;

a resistor connected to said power supply connection;

a capacitor connected to the free end of said resistor and to said ground connection;

a third diode connected from said first coil node to the connection between said resistor and said capacitor; and a fourth diode connected from said second coil node to the connection between said resistor and said capacitor.

11. The bridge circuit of claim 10 wherein said first cross coordinated switch pair includes a first switch connected between said power supply connection and said first coil node, and a second switch connected between said second coil node and said ground connection.

12. The bridge circuit of claim 11 wherein said second cross coordinated switch pair includes a third switch connected between said power supply connection and said second coil node, and a fourth switch connected between said second coil node and said ground connection.

13. The bridge circuit of claim 12 wherein said first diode has its anode connected to said ground connection and its cathode connected to said first coil node, and wherein said second diode has its anode connected to said ground connection and its cathode connected to said second coil node.

14. The bridge circuit of claim 13 wherein said third diode has its anode connected to said first coil node and its cathode connected to the connection between said resistor and said capacitor, and wherein said fourth diode has its anode connected to said second coil node and its cathode connected to the connection between said resistor and said capacitor.

15. The bridge circuit of claim 9 wherein said alternate circuit means includes:
    a first Zener diode connected on its cathode to said first coil node;
    a second Zener diode connected on its cathode to said second coil node; and
    a diode connect on its cathode to the anodes of said first and second Zener diodes and on its cathode to said ground connection.

16. The bridge circuit of claim 10 wherein said first, second, third and fourth switches are each switching transistors.

17. The bridge circuit of claim 15 wherein said first, second, third and fourth switches are each switching transistors.

18. An H-shaped bridge coil driver, for bilaterally applying excitation power from a power supply connection to a motor field coil connection and then to a ground connection, thereby causing current to flow therethrough alternating in direction, said coil driver being operable for a brushless electronically commutated D.C. motor, under the operation of control signals, comprising:
    a first and second coil node connections;
    a first series connected first and second diodes connected at one end of said series to a ground connection and at their intermediate point to said first coil node;
    a second series connected third and fourth diodes connected at one end of said series to said ground connection and at their intermediate point to said second coil node;
    a capacitor connected to each of said first and second series connected diode pairs free ends on one side thereof and to said ground connection on the other side thereof;
    a first resistor connected to said diode connection side of said capacitor;
    a fifth diode connected between said resistor free end and said power supply connection;
    a first power stage transistor switch connected to conduct between said first coil node and said first resistor to fifth diode connection point;
    a second power stage transistor switch connected to conduct between said second coil node and said first resistor to fifth diode connection point;
    a third power stage transistor switch connected to conduct between said first coil node and a second resistor, said second resistor being connected on its free end to said ground connection;
    a fourth power stage transistor switch connected to conduct between said second coil node and said second resistor;
    a fifth trigger switch transistor connected to conduct between the gate node of said third transistor and said ground connection;
    a sixth trigger switch transistor connected to conduct between the gate node of said fourth transistor and said ground connection;
    wherein said fifth and sixth transistors are connectable to be gated by alternated positive and negative voltage input control signals rendering said fifth and sixth transistors in alternating opposite states;
    a seventh triggering transistor connected to conduct between said power supply connection and the gate node of said first transistor;
    an eighth triggering transistor connected to conduct between said power supply connection and the gate node of said second transistor; and
    wherein the gate node of said seventh transistor is connected to the gate node of said fourth transistor, and wherein the gate node of said eighth transistor is connected to the gate node of said third transistor.

19. The coil driver of claim 18 also including a ninth signal transistor connected on its gate node to the third and fourth transistor connection side of said second resistor for providing an output synchronizing signal as a function of switching generated voltage spikes sensed at said second resistor.

20. The coil driver of claim 19 also including a third current bias resistor in said connection between the gate of said seventh transistor and said sixth transistor, and including a fourth current bias resistor in said connection between the gate of said eighth transistor and said fifth transistor.

21. The coil driver of claim 20 wherein:
    said first transistor and second resistors are each NPN transistors connected each on its respective collector node to said first resistor to fifth diode connection point;
    said third and fourth transistors are each PNP transistors connected each on its collector node to the second resistor to ninth transistor gate connection point;
    said seventh and eighth transistors are each PNP transistors connected each on its emitter node to said power supply connection; and
    said ninth transistor is an NPN transistor connected on its emitter node to said ground connection.

22. The coil driver of claim 21 wherein said first and second diodes in said first series connection are connected in the same polarity with anodes facing said ground connection, and wherein said third and fourth diodes in said second series connection are connected in the same polarity with anodes facing said ground connection.

23. The coil driver of claim 22 wherein said fifth diode is connected with its anode connected to said power supply connection.

24. The coil driver of claim 23 also including a reverse polarity diode in series with said power supply at said power supply connection.

25. The coil driver of claim 24 wherein said third and fourth resistor values are identical and chosen so that the turn on voltage at the gate nodes of said seventh and eighth transistors is about 85% of the power supply voltage and the collector node voltage of the fifth and sixth transistors is about 15% of the power supply voltage to gate off the respectively connected fourth and third transistors.

* * * * *